United States Patent
Basu Mallick et al.

(10) Patent No.: US 11,546,816 B2
(45) Date of Patent: Jan. 3, 2023

(54) METHOD AND APPARATUS FOR PERFORMING A HANDOVER PROCEDURE

(71) Applicant: Lenovo (Singapore) Pte. Ltd., New Tech Park (SG)

(72) Inventors: Prateek Basu Mallick, Dreieich (DE); Ravi Kuchibhotla, Chicago, IL (US); Hyejung Jung, Northbrook, IL (US); Joachim Löhr, Wiesbaden (DE); Ebrahim MolavianJazi, Santa Clara, CA (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 44 days.

(21) Appl. No.: 16/827,706

(22) Filed: Mar. 23, 2020

(65) Prior Publication Data
US 2020/0314711 A1    Oct. 1, 2020

Related U.S. Application Data

(60) Provisional application No. 62/825,795, filed on Mar. 28, 2019.

(51) Int. Cl.
*H04W 36/00* (2009.01)
*H04W 36/30* (2009.01)
*H04W 36/08* (2009.01)

(52) U.S. Cl.
CPC ..... *H04W 36/00837* (2018.08); *H04W 36/08* (2013.01); *H04W 36/305* (2018.08)

(58) Field of Classification Search
CPC ........ H04W 36/00837; H04W 36/305; H04W 36/08; H04W 36/24
See application file for complete search history.

(56) References Cited

U.S. PATENT DOCUMENTS

| | | | |
|---|---|---|---|
| 2019/0387440 A1* | 12/2019 | Yiu | H04W 36/00837 |
| 2021/0274404 A1* | 9/2021 | Koziol | H04W 36/00837 |
| 2022/0038985 A1* | 2/2022 | Deenoo | H04W 36/305 |

FOREIGN PATENT DOCUMENTS

WO    WO-2018175721 A1 *    9/2018    ............ H04W 24/10

OTHER PUBLICATIONS

U.S. Appl. No. 62/804,327,Specification,Feb. 12, 2019 (Year: 2019).*
3GPP, 3rd Generation Partnership Project; Technical Specification Group Radio Access Network; NR; Medium Access Control (MAC) protocol specification (Release 15), 3GPP TS 38.321 V15.4.0 (Dec. 2018).

(Continued)

*Primary Examiner* — Chi H Pham
*Assistant Examiner* — Ji-Hae Yea
(74) *Attorney, Agent, or Firm* — Loppnow & Chapa; Matthew C. Loppnow (57) ABSTRACT

A handover command message can be received. The handover command message can include at least one handover condition. The at least one handover condition can include an indication that handover can occur after at least one beam failure. A handover procedure can be performed based on the at least one handover condition.

20 Claims, 6 Drawing Sheets

(56) References Cited

OTHER PUBLICATIONS

3GPP, 3rd Generation Partnership Project; Technical Specification Group Radio Access Network; NR; Radio Resource Control (RRC) protocol specification (Release 15), 3GPP TS 38.331 V15.4.0 (Dec. 2018).

3GPP, 3rd Generation Partnership Project; Technical Specification Group Radio Access Network; NG-RAN; Xn application protocol (XnAP) (Release 15), 3GPP TS 38.423 V15.2.0 (Dec. 2018).

Del Sorbo, International Search Report, International Application No. PCT/IB2020/052898, European Patent Office, Rijswijk, NL, dated May 29, 2020.

Nokia et al: "Topology Management for Spanning Tree topologies", 3GPP Draft; R2-1817271 Topology Management for Spanning Tree Topologies, 3rd Generation Partnership Project (3GPP), Mobile Competence Centre ; 650, Route Des Lucioles ; F-06921 Sophia-Anti Polis Cedex, vol. RAN WG2, No. Spokane, USA; Nov. 12, 2018-Nov. 16, 2018 Nov. 12-16, 2018.

Huawei et al: "Overview on NR mobility enhancements" 3GPP Draft; R1-1903113, 3rd Generation Partnership Project (3GPP), Mobile Competence Centre; 650, Route Des Lucioles ; F-06921 Sophia-Antipolis Cedex ; France, vol. RAN WG1, No. Athens, Greece; Feb. 25, 2019-Mar. 1, 2019 Feb. 25-Mar. 1, 2019.

Nokia et al: "Backhaul link RLF handling", 3GPP Draft; R2-1900627 RLF in IAB Scenarios, 3rd Generation Partnership Project (3GPP), Mobil Competence Centre ; 650, Route Des Lucioles ; F-06921 Sophia-Antipolis Cedex ; France vol. RAN WG2, No. Athens, Greece; Feb. 25, 2019-Mar. 1, 2019 Feb. 25-Mar. 1, 2019.

\* cited by examiner

METHOD AND APPARATUS FOR PERFORMING A HANDOVER PROCEDURE

BACKGROUND

1. Field

The present disclosure is directed to performing a Handover (HO) procedure in a wireless network.

2. Introduction

Presently, a User Equipment (UE), such as a wireless communication device, communicates with other communication devices using wireless signals. Due to relatively small coverage in high frequency bands, such as frequency bands above 6 GHz, frequent handovers occur in a standalone deployment scenario of New Radio (NR). Thus, reliable and efficient HO procedures that allow very short interruption time, near 0 ms, a lower HO failure rate, and a fast recovery from HO failure need to be developed and specified to provide enhanced user experiences.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

At least some embodiments can provide a method and apparatus for enhanced beam failure and mobility handling. According to a possible embodiment, a HO command message can be received. The HO command message can include an indication of at least one candidate Reference Signal (RS) beam configuration with respect to a serving cell and/or a target cell. A HO procedure can be performed based on the indication of the at least one candidate RS beam configuration.

According to another possible embodiment, a HO command message can be received. The HO command message can include at least one HO condition. The at least one HO condition can include an indication that HO can occur after at least one beam failure. A HO procedure can be performed based on the at least one HO condition.

Figure 1:
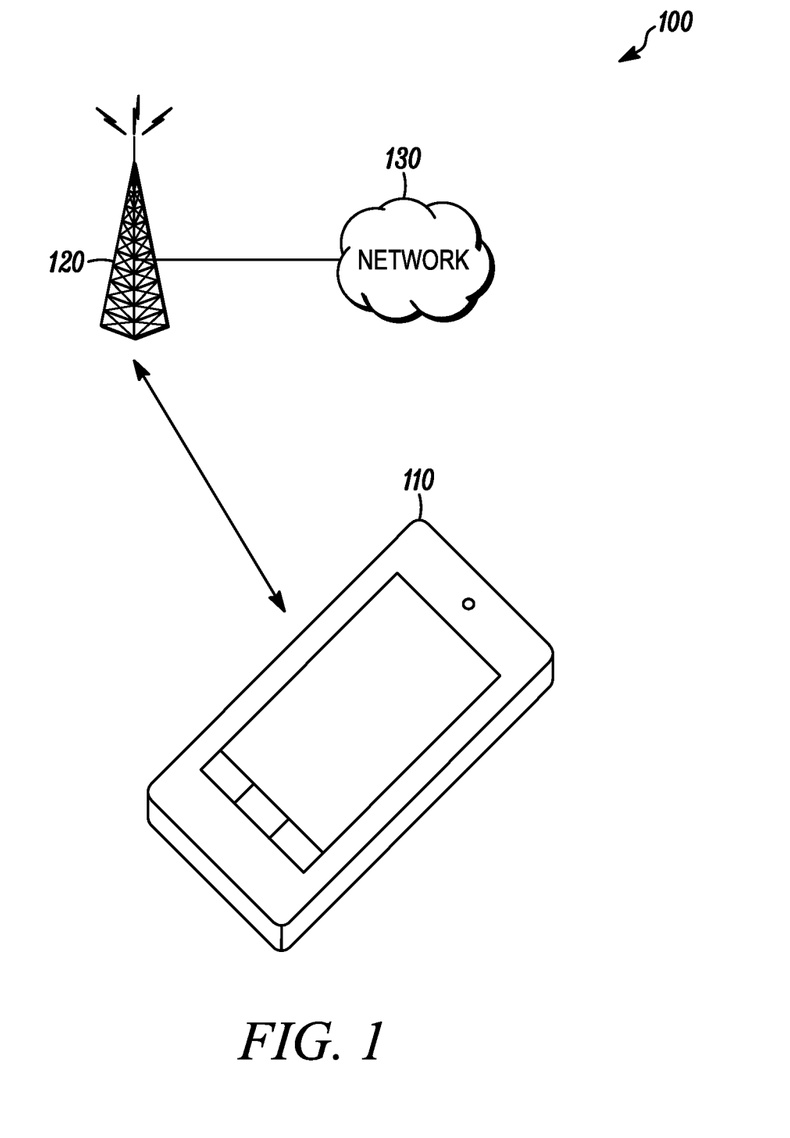
FIG. 1 is an example block diagram of a system according to a possible embodiment.

FIG. 1 is an example block diagram of a system 100 according to a possible embodiment. The system 100 can include a wireless communication device 110, such as a UE, a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th Generation (5G) network, a 3rd Generation Partnership Project (3GPP)-based network, a satellite communications network, a high altitude platform network, the Internet, and/or other communications networks.

In 5G New Radio (NR), a change of serving cell from one to another, such as a baseline HO mechanism specified to handle a UE's mobility, can occur when a source gNB triggers a HO based on a UE's measurement reports and/or load conditions by sending a HO request to a target gNB. After receiving Acknowledgement (ACK) from the target gNB, the source gNB can send a UE a HO command with target cell configuration. The UE can perform a random access procedure after Radio Resource Control (RRC) reconfiguration according to the received target cell configuration. In some cases, the RRC reconfiguration can be a full configuration.

In NR, a HO command can include one or more dedicated Random Access Channel (RACH) resources, each of which can be associated with a Synchronization Signal (SS)/Physical Broadcast Channel (PBCH) block or a Channel State Information-reference signal (CSI-RS) resource. The synchronization physical broadcast channel can be referred to as a Synchronization Signal Block (SSB). A UE can select one of the one or more dedicated RACH resources based on measurements of the associated SS/PBCH blocks or CSI-RS resources, e.g. Reference Signal Received Power (RSRP), for a contention-free random access. If the UE cannot find a suitable Downlink (DL) beam from the SS/PBCH blocks or CSI-RS resources associated with the dedicated RACH resources, then the UE can select a SS/PBCH block which does not have a dedicated preamble allocation for contention based random access. Note that the DL beam is conveyed via a SS/PBCH block or CSI-RS resource, and the DL beam can be considered to be suitable if the measurement value is above a configured threshold value.

At least some embodiments can provide enhanced mobility handling methods that take into account multi-beam based system operation in 5G NR. Different mobility enhancement mechanisms can be used. One mobility enhancement can be make before break in which a link of a source cell is maintained until RACH preamble transmission to a target cell starts. Another mobility enhancement can be a Random Access Channel (RACH)-less HO in which HO without random access procedure in the target cell. This can be suitable for a small cell deployment scenario where an Uplink (UL) timing advance value is close to zero and/or for a deployment with similar cell sizes where a UE can apply the same UL timing advance value as the source cell to the target cell. Another mobility enhancement can be make before break combined with RACH-less HO where the link of the source cell can be maintained until the first PUSCH transmission starts at the target cell.

Furthermore, dual-connectivity based mobility, where the UE can maintain simultaneous connections with the source cell and target cells, and UE based HO, where a HO command can be provided to a UE in advance and the UE can decide when to perform a HO, can be used.

While RACH-less HO can reduce interruption time, a RACH procedure during HO can be used for multi-beam-based system operation in NR. Since a RACH resource including time, frequency, and a preamble sequence in NR can be associated with one or more SS/PBCH blocks and/or CSI-RS resources, the UE can implicitly indicate a selected downlink beam, the selected SS/PBCH block and/or CSI-RS resource, to the gNB via a selected RACH resource. Further, information on the selected downlink beam can be used for subsequent communications, such as reception of Message 2 (Msg2) Physical Downlink Control Channel (PDCCH)/Physical Downlink Shared Channel (PDSCH), PDCCH for Message 3 (Msg3) re-transmission, and Message 4 (Msg4) PDCCH/PDSCH, until a link set-up with a new serving cell can be completed and the new serving cell configures a UE-specific serving beam(s).

A HO can fail if the UE does not receive the HO message from a source base station on time, due, for example, to rapidly changing radio conditions. In order to alleviate such a problem, a conditional HO message can be sent to the UE, where the source base station can command the UE to HO to an identified target base station, conditioned upon a certain requirement being fulfilled. Thus, the UE, after receiving the conditional HO message, can execute the HO when one of the included conditions is met, irrespective of having the link to the source base station still functioning reliably.

In the case of 3GPP NR radio, and in cases supporting multiple beams a HO can be executed to an identified downlink beam. At least some embodiments can provide for handling the additional complexity due to multiple beams at the source and potentially the target gNB.

Figure 2:
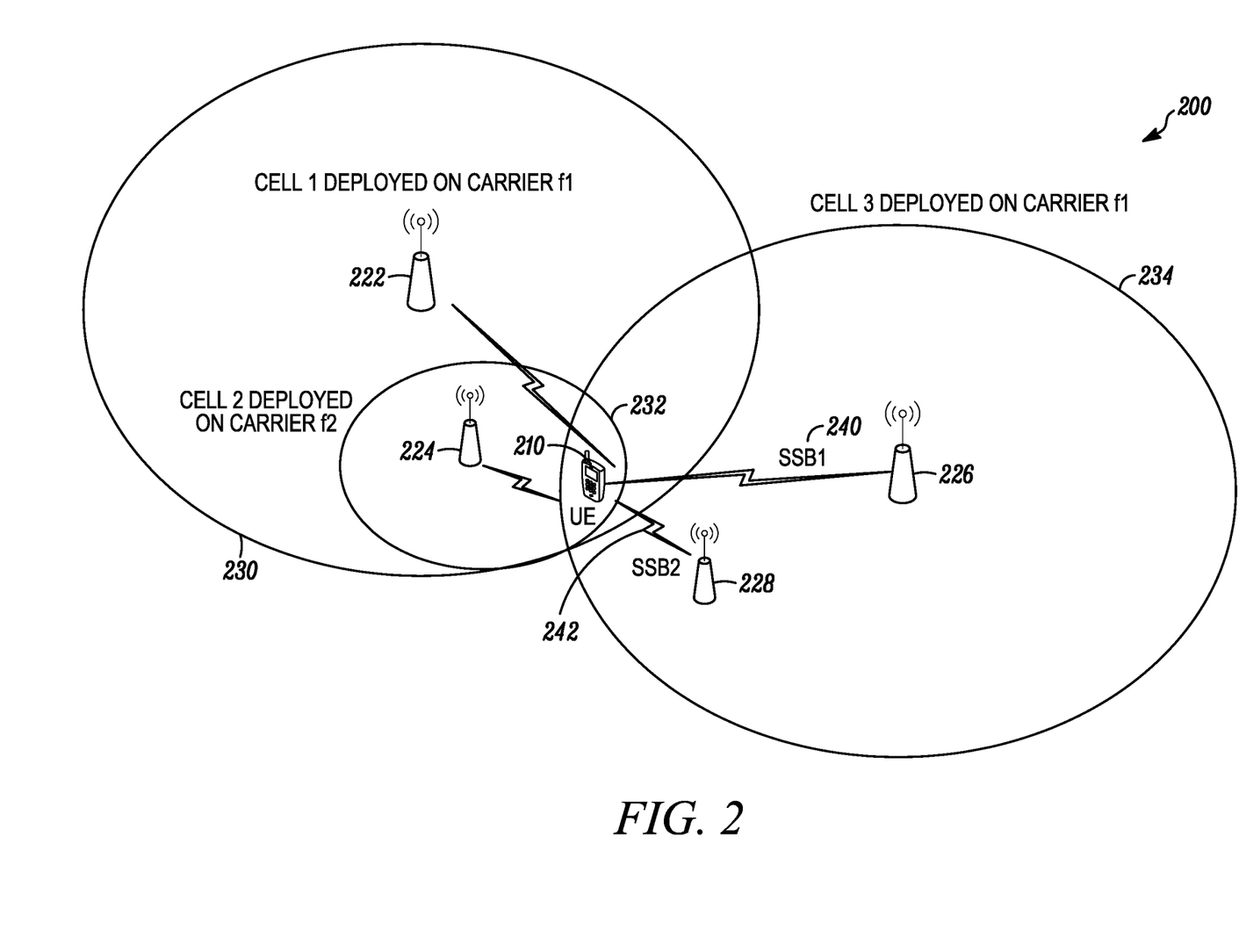
FIG. 2 is an example illustration of a UE moving between cells according to a possible embodiment.

FIG. 2 is an example illustration 200 of a UE moving from cell 1 and cell 2 to cell 3 according to a possible embodiment. The illustration 200 can include a UE 210, base stations 222, 224, 226, and 228, cell 1 230, cell 2 232, cell 3 234, SSB1 240, and SSB2 242. Cell 1 230 can be deployed on carrier f1 and cell 2 232 can be deployed on carrier f2. Base station 226 can transmit SSB1 240. Base station 228 can transmit SSB2 242.

A radio link reconfiguration procedure, which can be referred to as a beam recovery procedure, can handle a UE's mobility without a serving cell change. In an exemplary network entity, up to 16 dedicated Physical Random Access Channel (PRACH) resources can be configured for a UE to request for Beam Failure Recovery (BFR). The UE can determine whether to perform contention-free random access based on the configured dedicated PRACH resources or to perform contention based random access for BFR based on the measurements of configured reference signals corresponding to configured candidate beams and measurements of SSBs. After failing to recover from beam failure, the UE can initiate a HO procedure on a different target gNB or neighbor cell. The RRC protocol layer in the UE can initiate an RRC connection re-establishment procedure with one of the prepared neighbor cells for which the UE has the configured dedicated PRACH resources and the minimum configuration information for the target cell.

Figure 3:
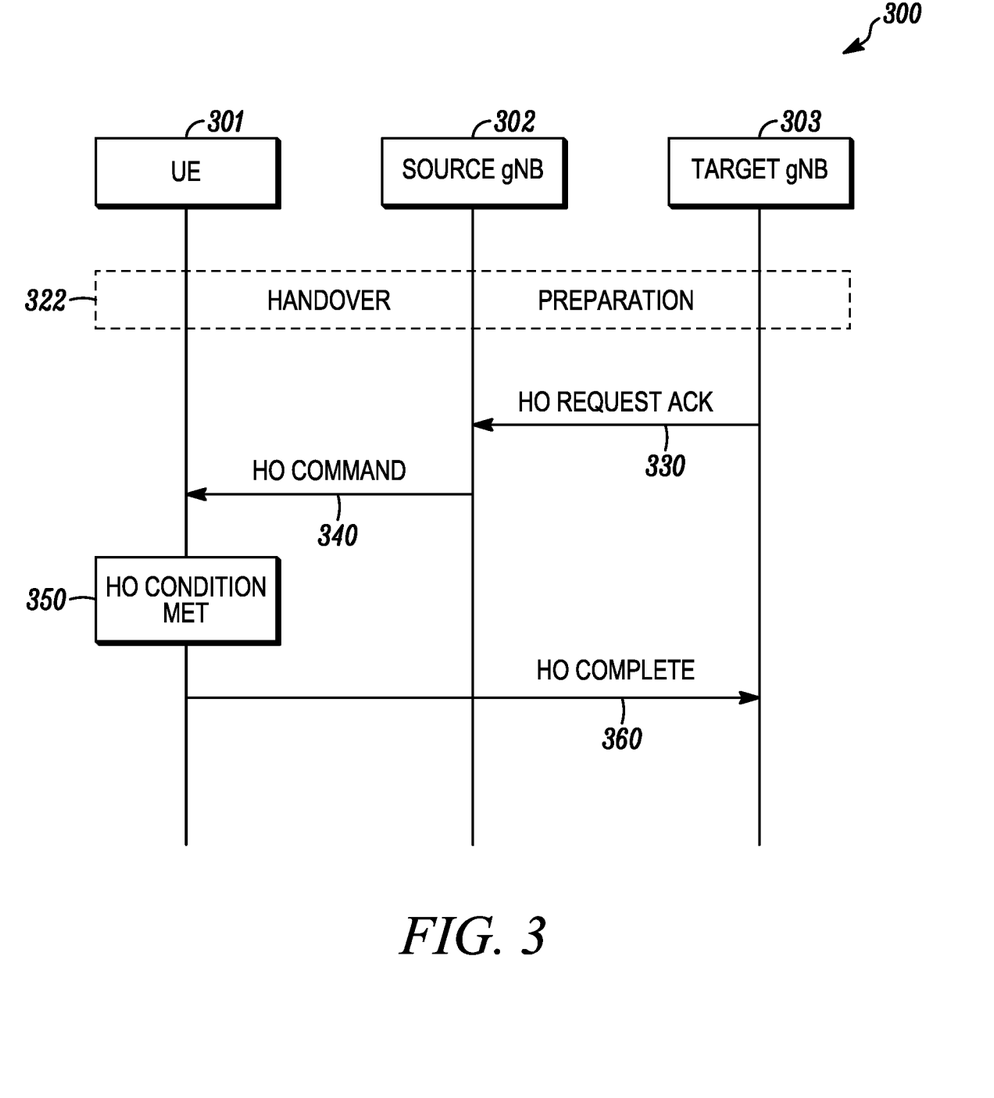
FIG. 3 is an example illustration of a HO procedure according to a possible embodiment.

FIG. 3 is an example illustration 300 of a signal flow diagram of a HO procedure according to a possible embodiment. The illustration 300 can include a UE 301, a source gNB 302, and a target gNB 303. The method can begin at 322, where the UE 301, source gNB 302, and target gNB 303 can prepare to execute a HO. The preparation can include the source gNB deciding that a HO can be required in the near future to a certain target gNB based on measurement report(s) from a UE. At 330, the target gNB 303 can send a message acknowledging the HO request to the source gNB 302. The source gNB can send a HO command message to the UE in step 340. The UE can determine if a HO condition has been met in step 350, and after the condition is met, the UE can send a message 360 to complete the HO. In the illustration 300, a source gNB and a target gNB are shown, however they can be two cells belonging to the same gNB, in which case the procedure can be shortened.

At reception of a HANDOVER REQUEST message during the HO preparation at 322, the target gNB node can prepare the "Target NG-RAN node To Source NG-RAN node Transparent Container", which can include a HandoverCommand message which can be defined in 3GPP. According to a possible embodiment, information can be included in the transparent container. Examples of the information can include candidate RS, such as CSI-RS or SSB, beams. Another example of the information can include PRACH resources corresponding to each of the included beam.

The target gNB can inform the source gNB about the inclusion of the above information in the transparent container. The source gNB can transparently forward the container which can include the above information to the UE. Based on this, the source gNB can prepare HO conditions and can then forward the HO command, which can be called RRCReconfiguration and can contain reconfigurationWithSync containing the "Target NG-RAN node To Source NG-RAN node Transparent Container", which can contain HO conditions for the UE. The HO conditions can include one or more conditions. One condition can be the time to execute a HO, where the time can be in milliseconds and can dictate how many milliseconds after receiving the HO command the UE can start to execute the HO. The amount of time can be configured in a timer, such as a T304 timer. Another condition can be the radio condition. A radio threshold, such as a RSRP value, where the UE can execute the HO when the source gNB falls below this threshold. Yet another condition can be beam failure in the source. The UE can execute the HO when the beam failure in the source side takes place and optionally when the UE tried unsuccessfully to recover the beam in the source from the candidate set of beam(s) a certain number of times or for a certain period of time.

In another embodiment, the UE can execute the HO procedure when the earliest of the above three conditions or the conditions included in the HO command triggers. Upon triggering of HO execution, the UE can attempt to synchronize to the target cell, can look for the best candidate beam in the target cell, can complete RACH procedure on the found candidate beam with the corresponding PRACH resources signaled in the HO command, and can transmit the HO complete message.

In another embodiment the target gNB or target cell can include some of the conditions in the transparent container. In some embodiments the source base station can add further conditions in the HO command message. In some embodiments, the source base station may not add further conditions in the HO command message. The UE, as indicated previously, can evaluate all the conditions irrespective of the sender of those conditions and can start the HO execution when any of the conditions have been met.

According to a possible embodiment, the target gNB can also include HO conditions of its own. In one such embodiment, a HO condition can include a direction to prioritize certain candidate beams of the target gNB over others.

According to another possible embodiment, the source gNB can include different HO conditions based on the current traffic profile in the UE. For example, the source gNB can bias the behavior of the UE differently based on whether the UE is engaged in Ultra Reliable Low Latency Communication (URLLC) traffic only or whether the UE is engaged in non-URLLC Enhanced Mobile Broadband (eMBB) traffic or both URLLC and eMBB. The HO condition can be set by the source gNB based on the identity of the target base station in the HO command. Different target base stations or different network architecture/deployment scenarios can require different HO conditions. For example, when the target base station, such as a gNB, and the source gNB are connected and controlled by a same Central Unit (CU) and all the configuration information needed to minimize the HO interruption time are common for the source and target gNBs, then a HO condition can be set such that the UE can execute the HO immediately after beam failure is detected. In another example, depending on whether the source or target gNB provides a Closed-Access Group (CAG) cell, the HO condition can be set differently. In one embodiment, the HO condition can include indicating to the UE to perform BFR procedure only on a subset of candidate beams on the source cell, including a null subset of a candidate set. In another embodiment, the HO condition can provide conditions for an early termination of the BFR, such as a link reconfiguration procedure, based on traffic being served, and/or based on the identity of the target cell. The HO condition can indicate to the UE to terminate the BFR procedure after failing to detect SS/PBCH blocks on the serving beam and when a characteristic, such as RSRP, of a candidate set of beams of the cell is above a certain threshold.

In another possible embodiment, multiple beams can be supported in the source cell. For example, the UE can be served with a serving beam, the radio quality of which it is monitoring. A candidate set of beams can also be monitored for potential switchover in case the serving beam suffers beam failure. The candidate set of beams can be configured with a dedicated RACH preamble in order to avoid the delay in going through a contention-based RACH process. A remaining set of beams on the source cell can be monitored if, for example, the UE fails to find a beam of adequate quality on the candidate set of beams. In some cases, there might be a measurement delay depending on the frequency of the SSB transmission over the remaining set. Furthermore, the remaining set of beams, which can have SSB transmissions, can be configured on a different Bandwidth Part (BWP) due to which there is a further switching delay, such as from a RF carrier frequency retuning delay. If the UE finds a beam from the remaining set of beams on the source cell, it can use a contention based RACH procedure in order to signal to the serving gNB the best beam to be served on. This procedure can occur prior to any HO mechanism being initiated to maintain the connection on the current serving gNB as opposed to being handed over to a new target gNB given the additional delays in configuration of the network and the UE for the HO procedure.

According to another possible embodiment, the source gNB can indicate to the UE to initiate a HO to a target gNB after failing to find a suitable SSB block or CSI-RS resource within a current serving cell during the link reconfiguration procedure, such as a BFR procedure. In this case, the lower layers in the UE can provide an indication to the RRC layer of the UE of such failure and the RRC can initiate an RRC connection re-establishment procedure with one of prepared neighbor cells for which the UE can have the configured dedicated PRACH resources and the minimum configuration information for the target cell.

In another possible embodiment, the source gNB can indicate to the UE to initiate a HO to a target gNB if measurement values of a certain number of SS/PBCH blocks for the cell are below the configured RSRP threshold. In another embodiment the source gNB can indicate to the UE to initiate a HO to a target gNB if the UE is in a power limited condition, such that it cannot meet the required transmit power even with the maximum configured transmit power, and/or the UE cannot detect any SS/PBCH block of the cell. Examples of the beams at the serving cell can be the originals serving beam, the candidate beams, and/or the remaining set of beams. The serving and candidate beams can belong to the same BWP whereas the remaining set can be associated with a different BWP. The UE can take time to tune to a different BWP and furthermore, depending on the periodicity of SSB/PBCH block transmission, the measurement opportunities for the UE to assess the strength of the remaining beam set can be limited and can lead to additional delays. In view of this, the base station can choose to bias the UE towards a HO as opposed to attempting a BFR in the current serving cell. In this case, in one embodiment, the network can include a HO condition that triggers a UE to terminate the BFR procedure early and proceed with the execution of the HO command. In one embodiment, the UE can terminate the BFR after failing to measure the reference signals of serving beams and the candidate beams to be above a certain threshold.

In one embodiment, a UE can receive a candidate beam set configuration for beam recovery, or link reconfiguration, which can include reference signals corresponding to candidate beams of different candidate target cells, such as the reference signals, SSB/CSI-RS, from different candidate target cells. Further, the UE can receive, as a part of BFR configuration, dedicated PRACH resources associated with reference signals of different candidate target cells. The HO condition can include when the UE selects a candidate beam of one of candidate target cells for the BFR procedure. With a successful BFR based on the candidate beam of one of the candidate target cells, the UE can transmit a HO complete message to the target cell.

In one possible embodiment, the periodic CSI-RS reference signal index or the SS/PBCH block index associated with the dedicated PRACH resource for the target gNB(s) can be included in the candidateBeamRSList, such as set $\bar{q}_1$, for radio link quality measurements for link recovery. Upon request from higher layers, the UE can provide to higher layers the periodic CSI-RS configuration indexes and/or SS/PBCH block indexes from the set $\bar{q}_1$, and can provide the corresponding L1-RSRP measurements that are larger than or equal to the $Q_{in,LR}$ threshold. $Q_{in,LR}$ can also be referred to as $Q_{in}$ and can refer to a signal quality threshold at which the radio quality of a given beam or cell as the case maybe can be considered good enough to sustain the link. In one example, the $Q_{in,LR}$ for the periodic CSI-RS reference signal or the SS/PBCH block associated with the dedicated PRACH resource for the target gNB(s) can be different, that is can be configured as a separate value or an offset relative to the $Q_{in,LR}$ for the source gNB, than the value for the CSI-RS or SSB associated with the dedicated PRACH resource for the source gNB or serving cell.

In another possible embodiment, the UE can be configured based on a higher-layer signaling to prioritize the UE to report to higher layers the periodic CSI-RS configuration indexes and/or SS/PBCH block indexes from the set $\bar{q}_1$, for the source gNB whose corresponding L1-RSRP measurements are larger than or equal to the $Q_{in,LR}$ threshold before reporting the indexes for the target gNB(s). The UE can report the periodic CSI-RS configuration indexes and/or SS/PBCH block indexes for the target gNB(s) whose corresponding L1-RSRP measurements that are larger than or equal to the $Q_{in,LR}$ threshold when the L1-RSRP measurements for all the periodic CSI-RS configuration indexes and/or SS/PBCH block indexes for the source gNB is smaller than the $Q_{in,LR}$ threshold. In another possible embodiment, there can be no restriction, which can be based on a higher-layer configuration signaling, on which periodic CSI-RS configuration indexes and/or SS/PBCH block indexes, whether belonging to the source gNB or the target gNB that meet the threshold condition, whose corresponding L1-RSRP measurements are larger than or equal to the $Q_{in,LR}$ threshold. This can be beneficial in scenarios where the source gNB and target gNB are tightly coordinated, which can occur, for example, when they have the same CU and/or the interruption time due to HO is minimized. In one example, HO interruption can be minimized if configurations are prepared in advance of the HO.

In another possible embodiment, an additional one or more of beamFailureInstanceMaxCount2, beamFailureDetectionTimer2, and/or beamFailureRecoveryTimer2 can be configured when the UE is configured with dedicated PRACH resources for the target gNB(s). The UE can use these new counter and timer values when the L1-RSRP measurement corresponding to at least one of the periodic CSI-RS configuration indexes and/or SS/PBCH block indexes for the target gNB(s) are larger than or equal to the $Q_{in,LR}$. Otherwise the UE can use the first timer configured for beam failure detection and BFR triggering. Examples of the timer can be, beamFailureInstanceMaxCount, beamFailureDetectionTimer, or beamFailureRecoveryTimer. The second counter and/or timer values can be different than the first counter and/or timer values. This can be beneficial for fast detection of beam failure in the source gNB and HO to the target gNB, such as for delay sensitive traffic such as URLLC.

Another possible embodiment can provide cross-carrier BFR via cell-index configuration. A cell index, and possibly a BWP index can be configured for a new candidate beam and corresponding dedicated PRACH resource for the BFR procedure so that the SSB/CSI-RS used for finding new candidate beams can be configured potentially on a different serving cell or non-serving cell than the serving cell on which the BFR occurs. The cell index can be an index of a configured serving cell, such as the PCell, the PSCell or an SCell, or a physical layer cell ID of a target cell that is not one of the configured serving cells. This scenario can be applicable to collocated, intra-band carrier aggregation where the cell index can refer to a collocated serving cell. This scheme can be considered as a version of a cross-carrier BFR. This scheme can also provide the benefits of a HO without actually making a HO. Further implicit or explicit operation can turn this scheme to an actual HO.

The BeamFailureRecoveryConfig Information Element (IE) can be used to configure the UE with RACH resources and candidate beams for BFR in case of beam failure detection. An example BeamFailureRecoveryConfig IE can be:

```
-- ASN1START
-- TAG-BEAM-FAILURE-RECOVERY-CONFIG-START
BeamFailureRecoveryConfig ::=            SEQUENCE {
    rootSequenceIndex-BFR                INTEGER (0..137)
OPTIONAL, -- Need M
    rach-ConfigBFR                       RACH-ConfigGeneric
OPTIONAL, -- Need M
    rsrp-ThresholdSSB                    RSRP-Range
OPTIONAL, -- Need M
    candidateBeamRSList                  SEQUENCE (SIZE(1..maxNrofCandidateBeams)) OF
PRACH-ResourceDedicatedBFR                  OPTIONAL, -- Need M
    ssb-perRACH-Occasion                 ENUMERATED {oneEighth, oneFourth, oneHalf, one, two,
four, eight, sixteen} OPTIONAL, -- Need M
    ra-ssb-OccasionMaskIndex             INTEGER (0..15)
OPTIONAL, -- Need M
    recoverySearchSpaceId                SearchSpaceId
OPTIONAL, -- Cond CF-BFR
    ra-Prioritization                    RA-Prioritization
OPTIONAL, -- Need R
    beamFailureRecoveryTimer             ENUMERATED {ms10, ms20, ms40, ms60, ms80,
ms100, ms150, ms200}                     OPTIONAL, -- Need M
    ...,
    [[
    msg1-SubcarrierSpacing-v1530         SubcarrierSpacing
OPTIONAL -- Need M
    ]]
}
PRACH-ResourceDedicatedBFR ::=            CHOICE {
    cell                                     CHOICE {
        cellId                               ServCellIndex OPTIONAL, --Cond
ConfiguredServCell                           -- Need R
        physCellId                           PhysCellId
        OPTIONAL, -- Cond HOAndServCellAdd
}
```

```
    ssb         BFR-SSB-Resource,
    csi-RS          BFR-CSIRS-Resource
}
BFR-SSB-Resource ::=            SEQUENCE {
    ssb         SSB-Index,
    ra-PreambleIndex            INTEGER (0..63),
    ...
}
BFR-CSIRS-Resource ::=          SEQUENCE {
    bwp-Id          BWP-Id                          OPTIONAL
        csi-RS                  NZP-CSI-RS-ResourceId,
    ra-OccasionList             SEQUENCE (SIZE(1..maxRA-OccasionsPerCSIRS)) OF
INTEGER (0..maxRA-Occasions-1)          OPTIONAL, -- Need R
    ra-PreambleIndex            INTEGER (0..63)
OPTIONAL, -- Need R
    ...
}
-- TAG-BEAM-FAILURE-RECOVERY-CONFIG-STOP
-- ASN1STOP
```

Figure 4:
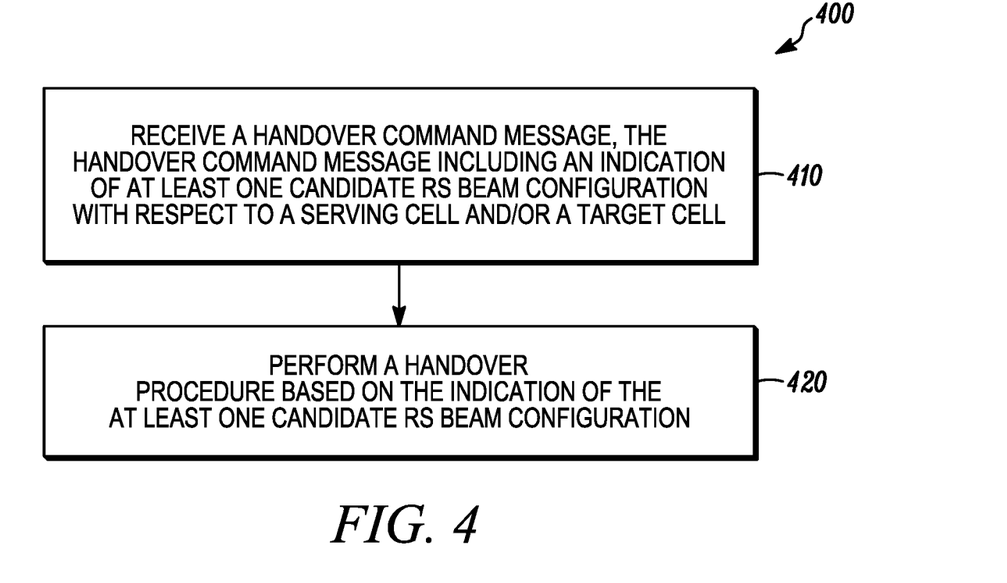
FIG. 4 is an example flowchart illustrating operation of a wireless communication device according to a possible embodiment.

FIG. 4 is an example flowchart 400 illustrating the operation of a wireless communication device, such as the wireless communication device 110, according to a possible embodiment. At 410, a HO command message can be received. The HO command message can be received from a serving cell. The HO command message can include an indication of at least one candidate RS beam configuration with respect to a serving cell and/or a target cell. The indication can be the at least one candidate RS beam configuration itself. The candidate RS beam configuration can be a CSI-RS beam configuration, an SSB beam configuration, and/or any other candidate RS beam configuration. The HO command message can also include PRACH resources corresponding to candidate RS beams of the at least one candidate RS beam configuration.

At 420, a HO procedure can be performed based on the indication of the at least one candidate RS beam configuration. For example, the HO procedure can include handing the UE over from source cell to a target cell.

According to a possible embodiment, at least one candidate RS beam of the candidate RS beam configuration can be evaluated. The HO procedure can be performed based on evaluating the at least one candidate RS beam. According to a possible implementation, a RS beam of the at least one candidate RS beam can be selected based on evaluating the at least one candidate RS beam. The HO procedure can be performed on the selected RS beam on the target cell.

Figure 5:
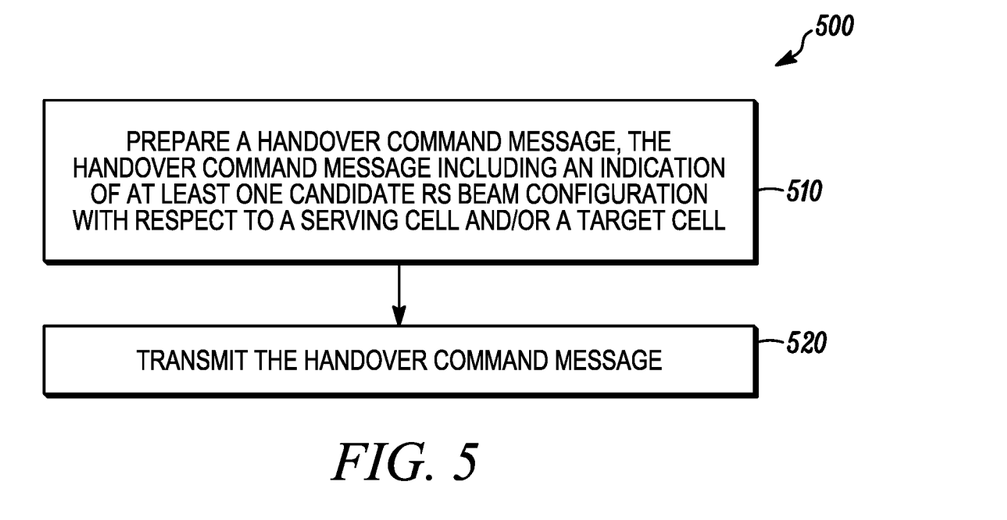
FIG. 5 is an example flowchart illustrating operation of a wireless communication device according to a possible embodiment.

FIG. 5 is an example flowchart 500 illustrating the operation of a wireless communication device, such as the base station 120, according to a possible embodiment. At 510, a HO command message can be prepared. The HO command message can include an indication of at least one candidate RS beam configuration with respect to a serving cell and/or a target cell. The candidate RS beam configuration can be a CSI-RS beam configuration, an SSB beam configuration, and/or any other candidate RS beam configuration. The HO command message can also include PRACH resources corresponding to candidate RS beams of the at least one candidate RS beam configuration. According to a possible embodiment, a HO request message can be received and the HO command message can be prepared in response to receiving the HO request message.

At 520, the HO command message can be transmitted. The HO command message can be transmitted from a network entity to a source node using a transparent container. For example, the HO command message can be transmitted to a source gNB, such as a serving gNB. The HO command message can be transmitted inside the transparent container. If the HO relates to a source cell and a target cell in the same gNB, the gNB can just prepare the HO command including the candidate RS beam configuration and transmit it directly to the UE.

Figure 6:
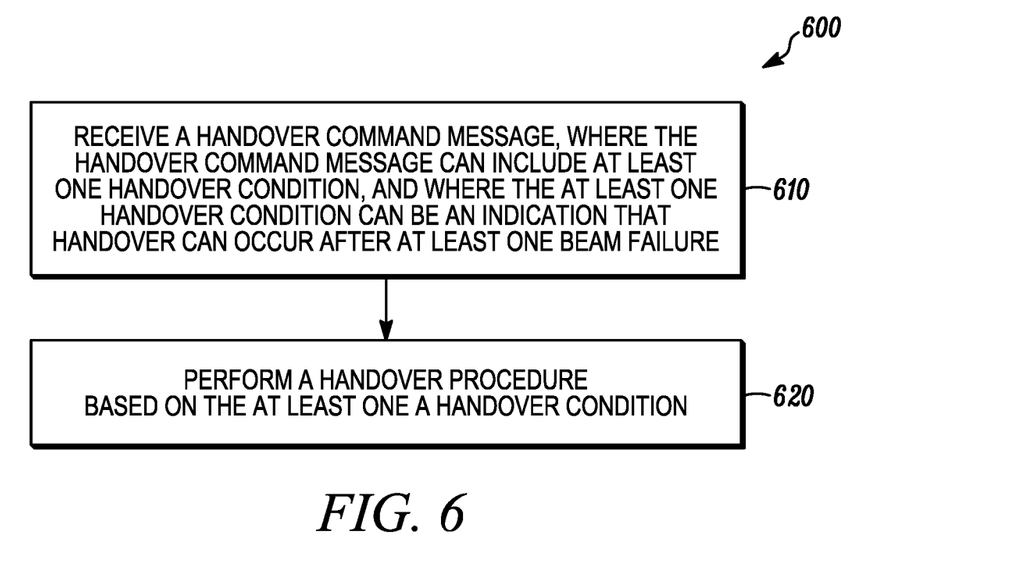
FIG. 6 is an example flowchart illustrating operation of a wireless communication device according to a possible embodiment.

FIG. 6 is an example flowchart 600 illustrating the operation of a wireless communication device, such as the wireless communication device 110, according to a possible embodiment. At 610, a HO command message can be received. The HO command message can be received from a serving cell. The HO command message can include at least one HO condition. The at least one HO condition can be an indication that HO can occur after at least one beam failure. The at least one HO condition can be an indication that HO can occur when recovery from beam failure is not successful. A HO condition can be an event that triggers the UE to execute a HO procedure.

According to a possible embodiment, the at least one HO condition can include failing to find at least one suitable synchronization signal block or CSI-RS resource within a current serving cell during a link reconfiguration procedure. The link reconfiguration procedure can be a beam failure recovery procedure. A synchronization signal block can be a SS/PBCH block.

According to a possible embodiment, the at least one HO condition can include beam failure recovery failing in the serving cell for a configured number of times, beam failure recovery failing in the serving cell for a configured duration of time, and/or other HO conditions. Beam failure recovery failure can be an unsuccessful RACH procedure on candidate beam.

According to other possible embodiments, the at least one HO condition can include measurement values of a certain number of synchronization signal blocks for the serving cell being below a configured RSRP threshold. The at least one HO condition can also include measurement values of serving set beam synchronization signal blocks for the serving cell being below a configured RSRP threshold. The at least one HO condition can also include measurement values of candidate set beam synchronization signal blocks for the cell being below a configured RSRP threshold.

According to a possible embodiment, a HO condition of the at least one HO condition can be evaluated with respect to the serving cell prior to initiating a HO procedure with one of prepared neighbor cells. According to a possible implementation, the HO condition can be a first HO condition. A second HO condition of the at least one HO condition can be evaluated with respect to the target cell prior to initiating a HO procedure with one of prepared neighbor cells.

At 620, a HO procedure can be performed based on the at least one HO condition. Performing the HO procedure can include starting a random access completion timer triggering a HO procedure at the target cell when any of the HO conditions of the at least one HO condition occur. The random access completion timer can time a time allowed for completion of the HO procedure. For example, the random access completion timer can be a T304 timer, an internal clock, or any other timer that can be used to for the time allowed for completion of the HO procedure.

According to a possible embodiment, an event that triggers the HO condition of the at least one HO condition can be detected. Performing the HO procedure can include starting the HO procedure in response to detecting the event that triggers the HO condition. A HO can include a reconfiguration with synchronization. A HO procedure can include a HO command and HO completion. An RRC connection establishment procedure can be performed a first time a UE connects to a cell and HO, such as reconfiguration with synchronization, can be performed when a UE moves from a serving cell to a target cell.

Figure 7:
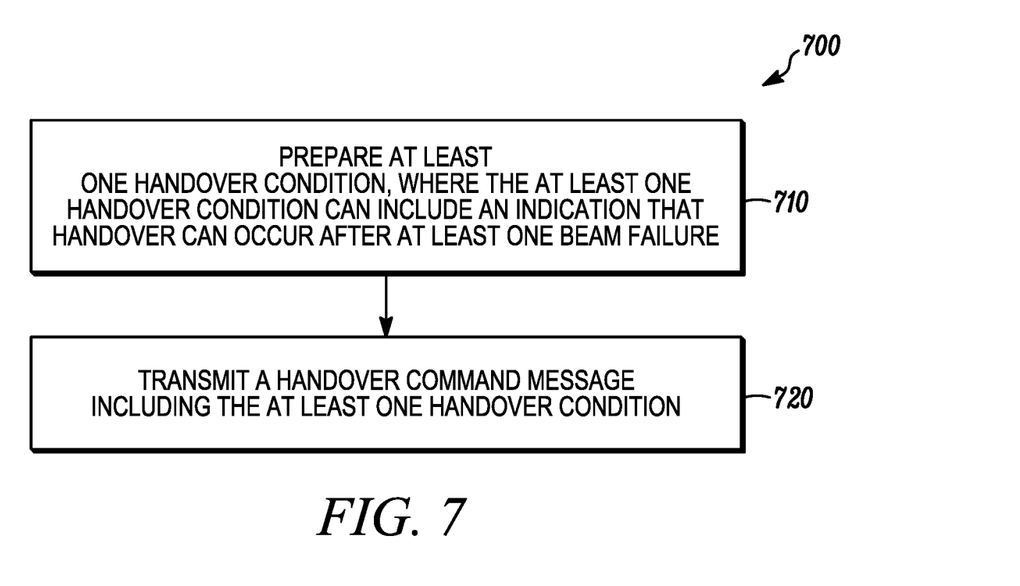
FIG. 7 is an example flowchart illustrating operation of a wireless communication device according to a possible embodiment.

FIG. 7 is an example flowchart 700 illustrating the operation of a wireless communication device, such as the base station 120, according to a possible embodiment. At 710, at least one HO condition can be prepared. The at least one HO condition can include an indication that HO can occur after at least one beam failure. At 720, a HO command message can be transmitted. The HO command can include the at least one HO condition. Other operations can be performed, such as reciprocal and complementary operations to UE operations and other operations disclosed in other embodiments.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
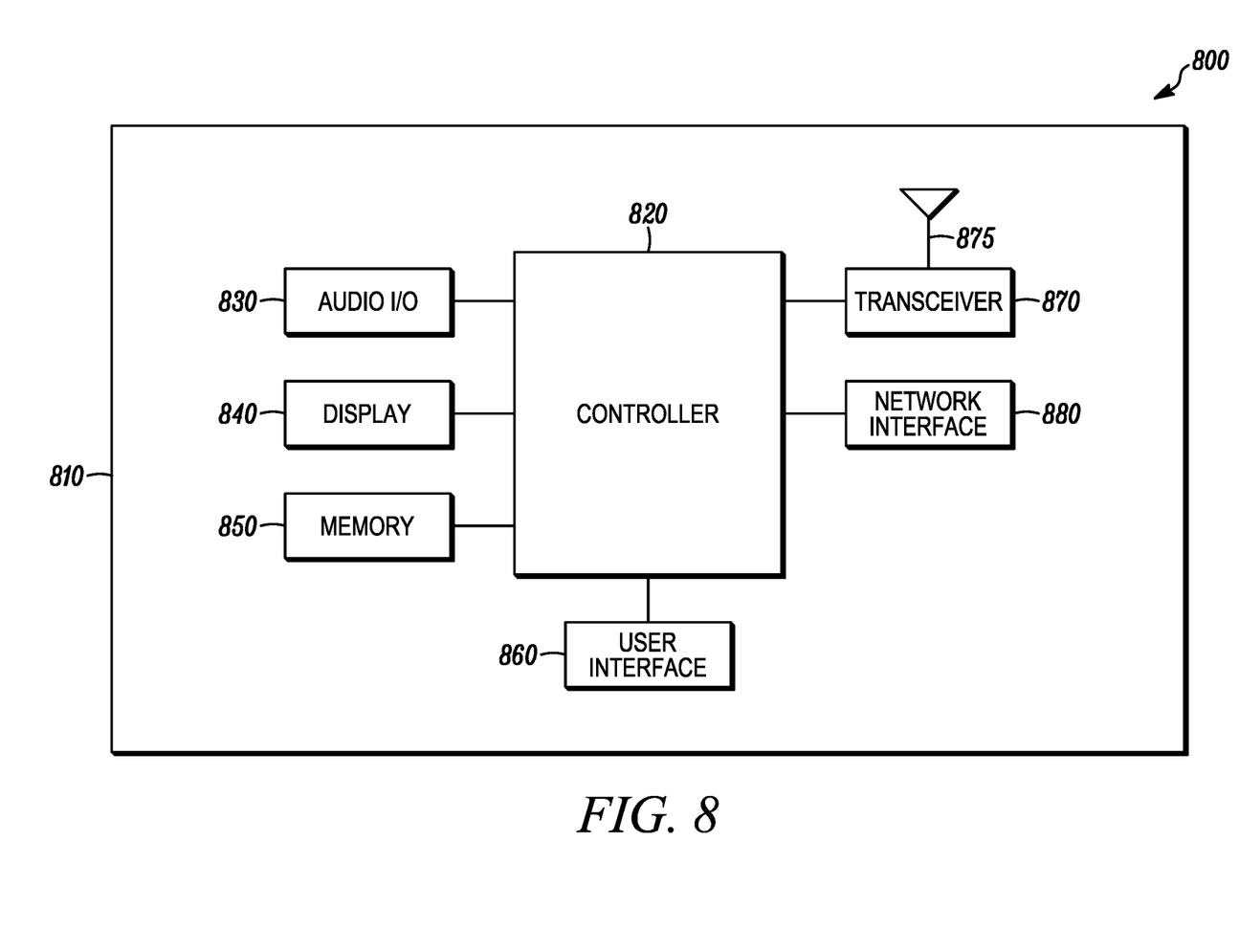
FIG. 8 is an example block diagram of an apparatus according to a possible embodiment.

FIG. 8 is an example block diagram of an apparatus 800, such as the wireless communication device 110 or the base station 120, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a solid-state memory, a flash memory, a removable memory, a hard drive, a cache, or any other memory that can be coupled to an apparatus.

The apparatus 800 or the controller 820 can implement any operating system, such as Microsoft Windows®, UNIX®, or LINUX®, Android™, or any other operating system. Apparatus operation software can be written in any programming language, such as C, C++, Java or Visual Basic, for example. Apparatus software can also run on an application framework, such as, for example, a Java® framework, a .NET® framework, or any other application framework. The software and/or the operating system can be stored in the memory 870 or elsewhere on the apparatus 800. The apparatus 800 or the controller 820 can also use hardware to implement disclosed operations. For example, the controller 820 can be any programmable processor. Disclosed embodiments can also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 can be any controller or processor device or devices capable of operating an apparatus and implementing the disclosed embodiments. Some or all of the additional elements of the apparatus 800 can also perform some or all of the operations of the disclosed embodiments.

According to a possible embodiment in operation as a UE, the transceiver 870 can receive a HO command message. The HO command message can include an indication of at least one candidate RS beam configuration with respect to a serving cell and/or a target cell. The candidate RS beam configuration can be a CSI-RS beam configuration, an SSB beam configuration, and/or any other RS beam configuration. The HO command message can also include PRACH resources corresponding to candidate RS beams of the at least one candidate RS beam configuration.

The controller 820 can perform a HO procedure based on the indication of the at least one candidate RS beam configuration. According to a possible implementation, the controller 820 can evaluate at least one candidate RS beam of the candidate RS beam configuration and can perform the HO based on evaluating the at least one candidate RS beam. According to a related possible implementation, the controller 820 can select a RS beam of the at least one candidate RS beam based on evaluating the at least one candidate RS beam and can perform the HO on the selected RS beam on the target cell.

According to a possible embodiment in operation as a base station, the controller 820 can prepare a HO command message. The HO command message including an indication of at least one candidate RS beam configuration with respect to at least one selected from a serving cell and a target cell. The candidate RS beam configuration can be a CSI-RS beam configuration, an SSB beam configuration, and/or any other RS beam configuration. The HO command message can also include PRACH resources corresponding to candidate RS beams of the at least one candidate RS beam configuration.

According to a possible implementation, the transceiver 870 can receive a HO request message. The controller 820 can prepare the HO command message in response to receiving the HO request message.

The transceiver 870 can transmit the HO command message. The transceiver 870 can transmit the HO command message over a wired or a wireless connection. The transceiver 870 can transmit the HO command message to a source node in a transparent container.

In operation as a UE, the transceiver 870 can receive a HO command message. The HO command message can be received from a serving cell. The HO command message can include at least one HO condition. The at least one HO condition can include an indication that HO can occur after at least one beam failure. The at least one HO condition can include an indication that HO can occur when recovery from beam failure is not successful.

The at least one HO condition can be beam failure recovery failing in the serving cell for a configured number of times, can be beam failure recovery failing in the serving cell for a configured duration of time, and/or can be any other HO condition. Beam failure recovery failure can be an unsuccessful RACH procedure on candidate beam.

According to a possible embodiment, the controller 820 can evaluate a HO condition of the at least one HO condition with respect to the serving cell prior to initiating a HO procedure with one of prepared neighbor cells. According to a possible embodiment, the HO condition can be a first HO condition. The controller 820 can evaluate a second HO condition of the at least one HO condition with respect to the target cell prior to initiating a HO procedure with one of prepared neighbor cells.

The controller 820 can perform a HO procedure based on the at least one a HO condition. The controller 820 can perform the HO procedure by starting a random access completion timer and by triggering a HO procedure at the target cell when any of the HO conditions of the at least one HO condition occur. The random access completion timer can time a time allowed for completion of the HO procedure.

According to a possible embodiment, the controller 820 can detect an event that triggers the HO condition of the at least one HO condition. The controller 820 can perform the HO procedure by starting the HO procedure in response to detecting the event that triggers the HO condition.

At least some embodiments can provide a method for a UE to receive a HO command message from a first serving cell. The HO command message can include conditions to be evaluated by the UE. The HO conditions can be evaluated by one of the source cell or target cell. An embodiment can include evaluating the HO condition at the serving cell or at the target cell prior to initiating an RRC connection re-establishment procedure with one of prepared neighbor cells. At least some of the embodiments can have HO conditions that include beam failures at the serving cell, BFR failing in the source cell for a configured number of times, and BFR failing in the source cell for a configured duration. At least some embodiments can further include starting a timer such as T304 and triggering an RRC connection re-establishment procedure at the target cell when any of the HO conditions included by the source cell are met.

At least some embodiments can include a UE receiving a HO command message from a first serving cell, the HO command including HO conditions to be evaluated by the UE, wherein the HO conditions can be evaluated by at least one of the source cell or target cell. The UE can receive a HO condition where the UE can be instructed to start the RRC connection re-establishment procedure after the UE fails to find a suitable SS/PBCH block or CSI-RS resource within a current serving cell during the link reconfiguration procedure. The UE can receive a HO condition where the UE can be instructed to start the RRC connection re-establishment procedure if measurement values of a certain number of SS/PBCH blocks for the cell are below the configured RSRP threshold. In at least some embodiments the UE can receive a HO condition where the UE can be instructed to start the RRC connection re-establishment procedure if the measurement values of the serving and candidate set beam SS/PBCH block for the cell are below the configured RSRP threshold. In at least some embodiments the UE can receive a HO condition where the UE can be instructed to start the RRC connection re-establishment procedure if measurement values of the candidate set beam SS/PBCH blocks for the cell are below the configured RSRP threshold.

The method of this disclosure can be implemented on a programmed processor. However, the controllers, flowcharts, and modules can also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures can be used to implement the processor functions of this disclosure.

While this disclosure has been described with specific embodiments thereof, it is evident that many alternatives, modifications, and variations will be apparent to those skilled in the art. For example, various components of the embodiments can be interchanged, added, or substituted in the other embodiments. Also, all of the elements of each figure are not necessary for operation of the disclosed embodiments. For example, one of ordinary skill in the art of the disclosed embodiments can be enabled to make and use the teachings of the disclosure by simply employing the elements of the independent claims. Accordingly, embodiments of the disclosure as set forth herein are intended to be illustrative, not limiting. Various changes can be made without departing from the spirit and scope of the disclosure.

In this document, relational terms such as "first," "second," and the like can be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but can include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
receiving, at the user equipment, a handover command message,
where the handover command message includes at least one handover condition, and
where the at least one handover condition comprises an indication that handover can occur after at least one beam failure; and
performing a handover procedure based on the at least one handover condition,
wherein the at least one handover condition further comprises at least one condition for an early termination of a beam failure recovery procedure,
wherein the method further comprises:
starting the beam failure recovery procedure;
terminating the beam failure recovery procedure based on the at least one condition for the early termination of the beam failure recovery procedure; and
performing the handover procedure based on the at least one condition for the early termination of the beam failure recovery procedure, and
wherein the at least one handover condition comprises either a first handover condition or a second handover condition, where the second handover condition is different from the first handover condition, and where the first handover condition biases user equipment behavior differently from the second handover condition based on the latency of traffic the user equipment is currently engaged in communicating.

2. The method according to claim 1, wherein the at least one handover condition further comprises an indication that handover can occur when recovery from beam failure is not successful.

3. The method according to claim 1, wherein the at least one handover condition includes at least one selected from
beam failure recovery failing in a serving cell for a configured number of times, and
beam failure recovery failing in a serving cell for a configured duration of time.

4. The method according to claim 1, wherein performing the handover procedure comprises:
starting a random access completion timer, where the random access completion timer times a time allowed for completion of the handover procedure; and
triggering a handover procedure at a target cell when any of the handover conditions of the at least one handover condition occur.

5. The method according to claim 1, further comprising detecting an event that triggers a handover condition of the at least one handover condition,
wherein performing the handover procedure comprises starting the handover procedure in response to detecting the event that triggers the handover condition.

6. The method according to claim 1, wherein the at least one handover condition comprises failing to find at least one suitable synchronization signal block or channel state information reference signal resource within a current serving cell during a link reconfiguration procedure.

7. The method according to claim 1, wherein the at least one handover condition comprises measurement values of a certain number of synchronization signal blocks for a serving cell being below a configured reference signal received power threshold.

8. The method according to claim 1, wherein the at least one handover condition comprises measurement values of serving set beam synchronization signal blocks for a serving cell being below a configured reference signal received power threshold.

9. The method according to claim 1, wherein the at least one handover condition comprises measurement values of candidate set beam synchronization signal blocks for the cell being below a configured reference signal received power threshold.

10. The method according to claim 1, wherein a condition for the early termination of the beam failure recovery procedure indicates to terminate the beam failure recovery procedure after failing to measure reference signals above a threshold on serving and candidate beams.

11. The method according to claim 1, wherein the at least one handover condition further comprises an indication to prioritize certain candidate beams over other candidate beams of a target cell.

12. The method according to claim 1, wherein the first handover condition biases the user equipment towards handover as opposed to beam failure recovery and the second handover condition biases the user equipment towards beam failure recovery as opposed to handover.

13. An apparatus comprising:
a transceiver that receives a handover command message,
where the handover command message includes at least one handover condition, and
where the at least one handover condition comprises an indication that handover can occur after at least one beam failure; and
a controller coupled to the transceiver, where the controller performs a handover procedure based on the at least one handover condition,
wherein the at least one handover condition further comprises at least one condition for an early termination of a beam failure recovery procedure,
wherein the controller
starts the beam failure recovery procedure,
terminates the beam failure recovery procedure based on the at least one condition for the early termination of the beam failure recovery procedure, and
performs the handover procedure based on the at least one condition for the early termination of the beam failure recovery procedure, and
wherein the at least one handover condition comprises either a first handover condition or a second handover condition, where the second handover condition is different from the first handover condition, and where the first handover condition biases user equipment behavior differently from the second handover condition based on the latency of traffic the user equipment is currently engaged in communicating.

14. The apparatus according to claim 13, wherein the at least one handover condition further comprises an indication that handover can occur when recovery from beam failure is not successful.

15. The apparatus according to claim 13, wherein the at least one handover condition includes at least one selected from
beam failure recovery failing in a serving cell for a configured number of times, and
beam failure recovery failing in a serving cell for a configured duration of time.

16. The apparatus according to claim 13, wherein the controller performs the handover procedure by
　　starting a random access completion timer, where the random access completion timer times a time allowed for completion of the handover procedure, and
　　triggering a handover procedure at a target cell when any of the handover conditions of the at least one handover condition occur.

17. The apparatus according to claim 13, wherein the controller
　　detects an event that triggers a handover condition of the at least one handover condition, and
　　performs the handover procedure by starting the handover procedure in response to detecting the event that triggers the handover condition.

18. The apparatus according to claim 13, wherein a condition for the early termination of the beam failure recovery procedure indicates to terminate the beam failure recovery procedure after failing to measure reference signals above a threshold on serving and candidate beams.

19. The apparatus according to claim 13, wherein the at least one handover condition further comprises an indication to prioritize certain candidate beams over other candidate beams of a target cell.

20. The apparatus according to claim 13, wherein the first handover condition biases the user equipment towards handover as opposed to beam failure recovery and the second handover condition biases the user equipment towards beam failure recovery as opposed to handover.

* * * * *